United States Patent [19]

Brinkmann et al.

[11] 4,059,549

[45] Nov. 22, 1977

[54] MOISTURE-HARDENABLE SEALING AND COATING COMPOUNDS

[75] Inventors: Bernd Brinkmann, Bad Zwischenahn; Eugen Griebsch, Nordkirchen, both of Germany

[73] Assignee: Schering Aktiengesellschaft, Berlin and Bergkamen, Germany

[21] Appl. No.: 686,033

[22] Filed: May 13, 1976

[30] Foreign Application Priority Data

May 16, 1975 Germany .......................... 2521841

[51] Int. Cl.$^2$ .............................. C09J 3/14; C09J 3/16
[52] U.S. Cl. ............................... 260/22 TN; 156/331; 260/18 TN; 260/77.5 AM; 260/77.5 TB
[58] Field of Search .... 260/18 TN, 22 TN, 77.5 AM, 260/77.5 TB

[56] References Cited

U.S. PATENT DOCUMENTS

| | | | |
|---|---|---|---|
| 3,267,078 | 8/1966 | Damusis | 260/77.5 TB |
| 3,316,189 | 4/1967 | Adams | 260/33.6 UB |
| 3,498,940 | 3/1970 | Laganis | 260/22 TN |
| 3,578,612 | 5/1971 | Burba et al. | 260/18 TN |
| 3,715,338 | 2/1973 | Schmelzer et al. | 260/77.5 TB |
| 3,882,072 | 5/1975 | Olstowski et al. | 260/18 TN |

OTHER PUBLICATIONS

Chemical Abstracts, vol. 78, No. 16, Apr. 23, 1973, p. 99228a.

*Primary Examiner*—Ronald W. Griffin
*Attorney, Agent, or Firm*—Curtis, Morris & Safford

[57] ABSTRACT

A sealing and coating compound hardening in the presence of moisture and comprising a mixture of a. an addition product formed between an excess of a di- or poly-isocyanate having aliphatic or cycloaliphatic isocyanate groups and a polyester polyol or a linear or branched polyalkylene oxide having terminal hydroxy groups, and b. a di- or poly-functional enamine which is prepared by reacting an aliphatic aldehyde or cyclic ketone and a polyaminoamide which is the condensation product formed between an excess of a secondary diamine and at least one acid selected from the group consisting of di- and poly-carboxylic acids having 6 to 72 carbon atoms.

10 Claims, No Drawings

MOISTURE-HARDENABLE SEALING AND COATING COMPOUNDS

The present invention relates to moisture-hardenable compositions for filling and sealing joints and for coating surfaces.

More in particular, the compositions of the present invention comprise a. an addition product formed between an excess of a di- or poly-isocyanate having aliphatic or cycloaliphatic isocyanate groups and a polyester polyol or a linear or branched polyalkylene oxide having terminal hydroxy groups, and b. a di- and/or polyfunctional enamine obtained by reacting an aliphatic aldehyde or cyclic ketone with a polyaminoamide prepared by condensing a di- and/or poly-carboxylic acid having 6 to 72 carbon atoms with an excess of a secondary diamine. The compositions may optionally contain additives conventionally found in filling and sealing compounds.

The compositions are used by introducing them into joints or by applying them onto a surface and letting them harden under the influence of moisture.

Elastic one-component polyurethane sealing compounds having a hardening rate similar to sealing compounds made from polysiloxanes and which, nevertheless, have a satisfactory storage stability, have not heretofore been known.

In the one-component polyurethane sealing compounds heretofore known, binders are used which are obtained by the addition of excess aromatic di- or poly-isocyanate to linear or branched polyethers. The hardening of such compounds occurs under the influence of atmospheric moisture by hydrolysis of the free isocyanate groups. Despite the addition of certain catalysts, this reaction does not occur very rapidly and, additionally, has the disadvantage that carbon dioxide evolution results, which leads to an undesired foaming of the compounds. A further acceleration of the reaction by the presence of additional catalysts has the disadvantage that the storage stability of the compounds is considerably reduced.

In a further development, German Auslegeschrift DAS 1,519,432 describes mixtures of polyols, containing blocked isocyanate end groups, and diimines, which mixtures are taught according to German Offenlegungsschrift DOS 1,719,121 to be suitable for the preparation of one-component sealing compounds. However, these compounds also have the disadvantage of a relatively slow hardening which is, additionally, strongly temperature-dependent, since despite the relatively rapid hydrolysis of the diimine, the reaction of the diamine which is set free with the blocked isocyanate end groups takes place too slowly. For example, both of the aforementioned systems, on exposure under normal climatic conditions, begin to show a certain skin formation only in the course of a day.

German Offenlegungsschrift DOS 2,125,247 discloses further storage stable mixtures of polyols containing isocyanate end groups and dienamine compounds.

The sealing compounds according to the present invention are particularly characterized by the fact that they harden quickly and without bubbles. This is all the more surprising since the addition products formed between linear or branched polyols and excess aliphatic diisocyanates alone show only a very slight tendency to react in the presence of atmospheric moisture. Further, it is surprising that the sealing and coating compounds according to the present invention, despite their high reactivity, have a sufficient storage stability for practical use if they are stored with the exclusion of atmospheric moisture.

In forming the addition products to be used according to the present invention, preferably from linear or branched polyalkylene oxides having terminal hydroxy groups, or from polyester polyols, and excess amounts of di- or poly-isocyanates having aliphatic and/or cycloaliphatic isocyanate groups, the following components are suitable.

As polyalkylene oxide starting materials, for example, those materials should be mentioned which are obtained by the anionic polymerization, copolymerization, and block copolymerization of alkylene oxides such as ethylene oxide, propylene oxide, and butylene oxide, with di- or poly-functional alcohols such as butane diol-1,4; hexane diol-1,6; 3,3,5(3,5,5)-trimethyl hexane diol-1,6; glycerine; 1,1,1-trimethylol ethane; 1,1,1-trimethylol propane; hexane triol-1,2,6; pentaerythritol; and sorbitol; or which are obtained by the cationic polymerization or copolymerization of cyclic ethers such as tetrahydrofuran, ethylene oxide, and propylene oxide using acid catalysts such as boron trifluoride etherate; or which are obtained by the polycondensation, with cleavage of water, of polycondensable glycols such as hexane diol-1,6, in the presence of acid etherification catalysts such as p-toluene sulfonic acid or of amines such as methylamine, ethylene diamine, and 1,6-hexamethylene diamine.

As polyester polyols, the following materials are suitable: the condensation products formed between di- and/or poly-carboxylic acids and diols and/or polyols; polyester polyols formed by the polycondensation of, for example, adipic acid; phthalic acid; tetrahydrophthalic acid; hexahydrophthalic acid; and endomethylene tetrahydrophthalic acid with ethylene glycol; butane diol-1,4; diethylene glycol; triethylene glycol; hexane diol-1,6; 2,2-dimethyl propane diol-1,3; 1,1,1-trimethylol propane; and hexane triol-1,2,6. Also, the polymerization products of lactones, such as $\epsilon$-caprolactone, are suitable.

The linear or branched polyalkylene oxides having terminal hydroxy groups, or the polyester polyols, have average molecular weights of 200 to 10,000, preferably 400 to 6,000. They can be added alone or as mixtures. Particularly when larger layer thicknesses are desired, the polyester polyols are preferably employed in admixture with one of the two other components.

As isocyanates, the following materials are exemplary: 1,6-hexamethylene diisocyanate; 1-methyl-2,4-diisocyanato-cyclohexane; isophorone diisocyanate; 2,4,4-trimethyl-1,6-diisocyanatohexane; N,N',N"-tri-(6-isocynatohexyl)-biuret; the reaction product formed between three mols of isophorone diisocyanate and one mol of water; and the addition product formed between three mols of isophorone diisocyanate and one mol of 1,1,1-timethylol propane.

The enamine condensation products to be employed according to the present invention are obtained by the reaction of 1. di- or tri-carboxylic acids of the formula $$R(-COOH)_n$$

wherein R is linear or branched, saturated or unsaturated, aliphatic or cycloaliphatic hydrocarbon having 4 to 69 carbon atoms and wherein $n$ is 2 or 3, with 2. an excess of a di-secondary or primary-secondary diamine under conditions conventional for amidation, and by a subsequent reaction, optionally in the presence of an entraining agent, with cleavage of water, of these reaction products with 3. aliphatic aldehydes or cyclic ketones.

As examples of the acids which can be used according to the present invention, the following materials are mentioned: adipic acid; pimelic acid; suberic acid; azelaic acid; sebacic acid; decamethylene dicarboxylic acid; isomeric mixtures comprising 6-carbomethoxy-7-carbomethoxymethyl-2,4,9-undecatriene and 6-carbomethoxy-7-carbomethoxyethyl-2,4,8-decatriene in a ratio of 1:1; 1,8(1,9)-heptadecane dicarboxylic acid; carboxymethyl stearic acid; adducts of unsaturated higher fatty acids such as oleic acid, linoleic acid, and linolenic acid with α,β-unsaturated mono- or di-carboxylic acids such as maleic acid or acrylic acid or their derivatives. The dimerized and trimerized fatty acids have proved particularly suitable.

The terms "dimerized fatty acid" and "trimerized fatty acid" refer generally to the polymerized acids which are obtained from fatty acids. The term "fatty acid" includes saturated and unsaturated, natural and synthetic, monovalent aliphatic acids having 8 - 24 carbon atoms. The preferred monocarboxylic acids are those having from 16 to 20 carbon atoms, the most preferred being those having 18 carbon atoms. These fatty acids can be polymerized according to methods known in the art.

Typical polymeric fatty acids which are commercially available have the following approximate composition:

| Monomeric acid | 5 - 15 percent by weight |
|---|---|
| Dimeric acid | 60 - 80 percent by weight |
| Trimeric acid | 10 - 35 percent by weight. |

The content of dimeric acid or trimeric acid can be raised to 100 percent by weight by known distillation processes.

The di-secondary diamines can be heterocyclic amines of the general formula

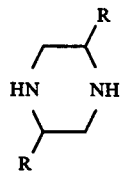

(1)

wherein R is H, but can be CH₃ if the amidation product is further reacted with an aldehyde; or can be of the general formula

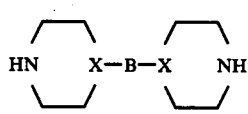

(2)

wherein X is CH or N and B is divalent alkyl having 2 - 6 carbon atoms or can be absent if X is CH; the primary-secondary diamines can have the general formula

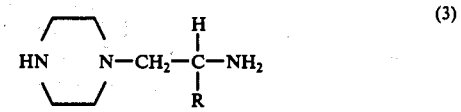

(3)

wherein R is H or CH₃.

Examples of the aforementioned diamines include piperazine; 2,5-dimethyl piperazine; dipiperidine; 4,4-dipiperidyl propane; 1,2-dipiperazinyl ethane; 1,3-dipiperazinyl propane; 1,4-dipiperazinyl butane; 1,5-dipiperazinyl pentane; 1,6-dipiperazinyl hexane; N-(2-aminoethyl)-piperazine; and N-(2-aminopropyl)-piperazine. Piperazine and dipiperidyl alkanes having 2 - 6 carbon atoms in the alkane portion are preferred.

The reaction of the di- or tri-carboxylic acids with the diamines takes place under the reaction conditions conventional for amidation, preferably at temperatures from 140° C. to 220° C., optionally in the presence of a high-boiling solvent such as xylene. The diamines are employed in excess, preferably in an amount such that the ratio of amino groups to carboxy groups is 2:1.

As the carbonyl components, the following materials are used:

1. aldehydes of the general formula

R—CHO, wherein R is linear or branched hydrocarbon having 2 - 13 carbon atoms, or, preferably, 2. cyclic ketones of the general formula

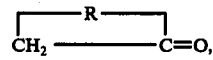

wherein R is a tri- or tetra-methylene group which can optionally be alkyl-substituted.

Exemplary of the aforementioned aldehydes and ketones are: propionaldehyde; n-butyraldehyde; isobutyraldehyde; diethylacetaldehyde; 2-ethylhexanal; 3-methyl butanal; 2-methyl pentanal; isotridecylaldehyde; cyclopentanone; cyclohexanone; isomeric trimethyl cyclopentanone; and trimethyl cyclohexanone.

The reaction of the carbonyl components with the amidation products follows with the azeotropic removal of water in a water separator, whereby the aldehyde or ketone can optionally be employed in excess and the mixture heated in a water separator, optionally with the addition of an entraining agent.

After the cleavage of water is completed, the solvent and excess carbonyl component are removed.

The isocyanate adduct component of the sealing and coating compounds according to the present invention is preferably prepared from a linear or branched polyol and an aliphatic diisocyanate. Polypropylene glycols having an average molecular weight from 400 to 6000 reacted with isophorone diisocyanate can be used with particular advantage, wherein the product preferably contains a ratio of isocyanate groups to hydroxy groups of 1.8 - 2.2:1.

Particularly advantageous hardening behavior is observed if the enamine condensation products of the present invention are mixed in stoichiometric amounts with the isocyanate adducts. Nevertheless, some other ratio can also be chosen to bring about variations in the hardening behavior or in the mechanical properties.

Modification can also be achieved by the admixture of linear and branched components.

For further formulation, the mixture can contain conventional plasticizers, thinners, thickeners, thixotropic agents, fillers, and coloring agents. The masses may also contain anti-oxidants, UV-absorbers, and biocides.

Care should be taken that materials which are sufficiently dried are used and that the materials do not contain ingredients which are reactive with isocyanate.

The working up of all the components can be done in conventional mixers and kneaders, whereby moisture must be strictly excluded.

Hardening takes place either by applying the sealing and coating compounds of the invention in a desired manner and exposing them to the influence of water or water vapor (e.g. atmospheric moisture), or by first combining them with water and then using them in the desired fashion.

A better understanding of the present invention and of its many advantages will be had by referring to the following specific Examples, in which Examples 1 - 7 illustrate the preparation of typical components of the sealing and coating compounds and Examples 8 - 13 pertain to coating and sealing compounds prepared from these components.

EXAMPLE 1

570 g of a dimerized tall oil fatty acid (having a dimeric fatty acid content of 96 percent) are combined with 172.1 g of anhydrous piperazine and 140 ml of xylene. After the addition of 0.6 g of phosphoric acid, the mixture is heated for three hours under reflux. Then a water separator is used and the product is heated for a further nine hours under reflux, whereby the sump temperature rises to about 170° C. After determination of the free amine content of the mixture, an equivalent amount of 3,3,5-trimethyl cyclohexanone, as well as a further 20 percent excess of this material, is added. Then, 0.6 g of formic acid is added and the mixture is heated for a further 14 hours using a water separator.

During this time, the sump temperature rises to about 175° C. A water yield of about 90 percent of theory is obtained. The solvent and excess ketone are removed under vacuum up to a temperature of about 170° C. The highly viscous yellowish reaction product has a content of tertiary amine groups (enamine groups) corresponding to 108 mg KOH/g.

EXAMPLE 2

73.1 g of adipic acid are combined with 214 g of dipiperidyl propane and 25 ml of xylene. After the addition of 0.3 ml of phosphoric acid, the mixture is heated for 1 hour under reflux. Then, a water separator is introduced and the product is heated under reflux for a further two hours, whereby the sump temperature rises to about 200° C.

After determination of the free amine content of the mixture, an equivalent amount of 3,3,5-trimethylcyclohexanone, as well as a 20 percent excess of this material, is added. Then, 1 ml of formic acid and 100 ml of xylene are added and the mixture is heated for a further 10 hours using a water separator. A water yield of about 92 percent of theory is obtained.

The solvent and excess ketone are removed under vacuum up to a temperature of about 170° C.

The resin-like yellowish reaction product has a content of tertiary amine groups (enamine groups) corresponding to 148 mg KOH/g (theoretical = 140).

EXAMPLE 3

115 g of decamethylene dicarboxylic acid are combined with 214 g of dipiperidyl propane and 25 ml of xylene. After the addition of 0.3 ml of phosphoric acid, the mixture is heated for 1 hour under reflux. Then a water separator is introduced and the product is heated under reflux for a further two hours, whereby the sump temperature rises to about 200° C.

After determination of the free amine content of the mixture, the equivalent amount of 3,3,5-trimethyl cyclohexanone, as well as a 20 percent excess of this material, is added. Then 1 ml of formic acid and 100 ml of xylene are added and the mixture is heated for a further 10 hours using a water separator. A water yield of about 88 percent of theory is obtained.

The solvent and excess ketone are removed under vacuum up to a temperature of about 170° C.

The resin-like yellowish reaction product has a content of tertiary amine groups (enamine groups) corresponding to 132.9 mg KOH/g (theoretical = 126.5).

EXAMPLE 4

331 g of 1,8 (1,9)-heptadecane dicarboxylic acid (acid number = 345) are combined with 172.2 g of anhydrous piperazine and 100 ml of xylene. After the addition of 0.5 g of phosphoric acid, the mixture is heated for two hours under reflux. Then a water separator is introduced and the product is refluxed for a further seven hours, whereby the sump temperature rises to about 170° C.

After determination of the free amine content of the mixture, the equivalent amount of 3,3,5-trimethyl cyclohexanone, as well as an excess of 10 percent of this material, is added. Then, 0.5 ml of formic acid and 50 ml of xylene are added and the mixture is heated for a further 10 hours using a water separator. A water yield of about 84 percent of theory is obtained.

The solvent and excess ketone are removed under vacuum up to a temperature of about 160° C.

The highly viscous brownish reaction product has a content of tertiary amine groups (enamine groups) corresponding to 163.3 mg of KOH/g.

EXAMPLE 5

285 g of a trimeric tall oil fatty acid having a content of about 80 percent by weight of trimeric acid are combined with 85.5 g of anhydrous piperazine and 70 ml of xylene. After the addition of 0.3 g of phosphoric acid, the mixture is heated for three hours under reflux. Then a water separator is introduced and the product is refluxed for a further 9 hours, whereby the sump temperature rises to about 160° C.

After determination of the free amine content of the mixture, the equivalent amount of 3,3,5-trimethyl cyclohexanone, as well as an excess of 25 percent of this material, is added. Then, 0.3 ml of formic acid is added and the mixture is heated for a further 14 hours using a water separator. During this time, the sump temperature rises to about 160° C. A water yield of 100 percent of theory is obtained.

The solvent and excess ketone are removed under vacuum up to a temperature of about 160° C.

The highly viscous yellowish reaction product has a content of tertiary amine groups (enamine groups) corresponding to 101 mg KOH/g.

Comparative hardening times for commercially-available sealing and coating compounds are also reported.

| | FORMULATION DATA | | | PROPERTIES OF FORMULATED COMPOUND | | |
|---|---|---|---|---|---|---|
| | Enamine from | Enamine Content | Amount Added | Skin Formulation Time | Elongation at Break According to DIN 18540 | |
| Example | Example No. | (mg KOH/g) | (g) | (Minutes) | % | kg/cm² |
| 8 | 1 | 108 | 116.3 | 30 | 530 | 4.1 |
| 9 | 2 | 148 | 93.2 | 15 | 400 | 5.5 |
| 10 | 3 | 132.9 | 103.5 | 25 | 450 | 4.5 |
| 11 | 4 | 163.3 | 84.7 | 25 | 460 | 4.2 |
| 12 | 5 | 101 | 136.3 | 15 | 420 | 6.5 |
| 13 | 6 | 108 | 132.4 | 30 | 515 | 2.7 |

EXAMPLE 6

114 g of a dimerized tall oil fatty acid (having a dimeric fatty acid content of 96 percent) are combined with 84 g of dipiperidyl propane and 100 g of xylene.

After the addition of 0.2 g of phosphoric acid, the mixture is heated using a water separator for 4 hours at 145° C. During this time, about 5 g of water separate.

After cooling, 29 g of isobutyraldehyde are added and the mixture is heated for a further six hours at 140° – 145° C. using a water separator. A further 7.5 g of water separate. Then, solvent and excess aldehyde are drawn off in a vacuum at a temperature up to about 150° C.

The highly viscous reaction product has a content of tertiary amino groups (enamine groups) corresponding to 108 mg KOH/g.

EXAMPLE 7

3.5 kg of isophorone diisocyanate are combined, with stirring, with 30 g of dibutyl tin dilaurate in a 50 liter reactor equipped with a stirrer and nitrogen inlet tube. Subsequently, 25.75 kg of a branched polypropylene glycol having a hydroxy content corresponding to 35.7 mg KOH/g are slowly added. The trifunctional polypropylene glycol has a molecular weight of (56100 × 3)/35.7 = 4714. The ratio of isocyanate groups to hydroxy groups in the mixture is 1.92:1.

The mixture is then warmed for 3 hours at 75° C.

The reaction product has an isocyanate content corresponding to 27.6 mg KOH/g.

EXAMPLES 8 – 13

Sealing and coating compounds according to the present invention are prepared in a kneader equipped with a vacuum seal using the following formulation, to which the amounts of enamine given in the following Table are added and worked in well:
- 500 g of the addition product prepared according to Example 7;
- 240 g of hydrophobized highly-dispersed silicic acid;
- 504 g of polyvinyl chloride powder;
- 67 g of titanium dioxide;
- 1.215 g of diisocdecylphthalate; diisodecylphthalate;
- 2 g of carbon black/pigment paste, and
- 212 g of xylene.

After degassing the masses can be readily worked.

With the exclusion of moisture, the compounds can be stored for several months at room temperature, for example in conventional cartridges.

Samples stored in air under normal climatic conditions for three weeks had the mechanical properties and hardening behavior reported in the following Table.

In comparison, a commercial sealing compound comprising blocked isocyanates and diimines had a skin formation time of 20 hours, while a commercially available sealing compound comprising products with free isocyanate groups had a skin formation time of 30 hours.

What is claimed is:

1. A sealing and coating compound hardening in the presence of moisture and comprising a mixture of substantially equimolar amounts of
   a. an addition product formed between an excess of a di- or poly-isocyanate having aliphatic or cycloaliphatic isocyanate groups and a polyester polyol or a linear or branched polyalkylene oxide having terminal hydroxy groups, and
   b. a di- or poly-functional enamine which is prepared by reacting an aliphatic aldehyde or cyclic ketone and a polyaminoamide which is the condensation product formed between an excess of a di-secondary or primary-secondary diamine and at least one acid selected from the group consisting of di- and poly-carboxylic acids having 6 to 72 carbon atoms.

2. A sealing and coating compound as in claim 1 wherein said addition product (a) is formed between an excess of a di- or poly-isocyanate having aliphatic isocyanate groups and a polyalkylene oxide having terminal hydroxy groups.

3. A sealing and coating compound as in claim 2 wherein said polyalkylene oxide is a polypropylene glycol having an average molecular weight from 400 to 6000.

4. A sealing and coating compound as in claim 2 wherein said isocyanate is 1-isocyanato-3-isocyanatomethyl-3,5,5-trimethyl cyclohexane.

5. A sealing and coating compound as in claim 2 wherein said addition product is formed from amounts of said isocyanate and said polyalkylene oxide such that the ratio of isocyanate groups to hydroxy groups is 1.8–2.2:1.

6. A sealing and coating compound as in claim 1 wherein the acid component of said polyaminoamide used in preparing enamine (b) is a dimeric fatty acid.

7. A sealing and coating compound as in claim 1 wherein the amine component of said polyaminoamide used in preparing enamine (b) is a heterocyclic di-secondary diamine.

8. A sealing and coating compound as in claim 7 wherein said heterocyclic di-secondary diamine is piperazine or a di-piperidyl alkane having 2 to 6 carbon atoms on the alkane portion thereof.

9. A sealing and coating compound as in claim 1 wherein said enamine (b) is prepared by reacting a polyaminoamide with a cyclic ketone.

10. A sealing and coating compound as in claim 9 wherein said cyclic ketone is 3,3,5-trimethyl cyclohexanone.

* * * * *